(12) United States Patent
Watkins

(10) Patent No.: US 10,024,195 B2
(45) Date of Patent: Jul. 17, 2018

(54) SYSTEM AND METHOD FOR HEATING MAKE-UP WORKING FLUID OF A STEAM SYSTEM WITH ENGINE FLUID WASTE HEAT

(71) Applicant: General Electric Company

(72) Inventor: Richard Michael Watkins, Spring, TX (US)

(73) Assignee: General Electric Company, Schenectady, NY (US)

( * ) Notice: Subject to any disclaimer, the term of this patent is extended or adjusted under 35 U.S.C. 154(b) by 46 days.

(21) Appl. No.: 14/626,856

(22) Filed: Feb. 19, 2015

(65) Prior Publication Data
US 2016/0245125 A1 Aug. 25, 2016

(51) Int. Cl.
*F01K 7/44* (2006.01)
*F01K 23/06* (2006.01)
(Continued)

(52) U.S. Cl.
CPC ............... *F01K 11/02* (2013.01); *F01K 5/00* (2013.01); *F01K 7/44* (2013.01); *F01K 23/02* (2013.01);
(Continued)

(58) Field of Classification Search
CPC ..... F22D 1/28; F22D 1/30; F22D 1/50; C02F 1/20; F01K 23/00; F01K 23/02; F01K 23/06; F01K 23/065; F01K 23/08; F01K 23/10–23/108; F01K 3/06; F01K 3/18; F01K 3/185; F01K 3/24; F01K 7/00; F01K 7/34; F01K 7/38; F01K 7/44; F01K 13/00;
(Continued)

(56) References Cited

U.S. PATENT DOCUMENTS 278,694 A 6/1883 Fallows
1,620,163 A 3/1927 Milliff et al.
(Continued)

FOREIGN PATENT DOCUMENTS

CA 2488434 6/2005
CN 102762501 A 10/2012
(Continued)

OTHER PUBLICATIONS

U.S. Appl. No. 14/259,003, filed Apr. 22, 2014, Richard Michael Watkins.
(Continued)

*Primary Examiner* — Laert Dounis
(74) *Attorney, Agent, or Firm* — Fletcher Yoder, P.C.

(57) ABSTRACT

A system including an engine and a heat exchanger coupled to the engine is provided. The engine includes an engine fluid and at least one of a compressor section configured to compress a gas, a lubricant path configured to circulate a lubricant, or a coolant path configured to circulate a coolant. The engine fluid comprises at least one of the gas, the lubricant, or the coolant, and the engine fluid is a source of heat derived from one or more operations of the engine. The heat exchanger is configured to receive the engine fluid from the engine and exchange heat between the engine fluid and a working fluid to produce a heated working fluid and a cooled engine fluid, and the heat exchanger is configured to export the heated working fluid to a steam system.

17 Claims, 4 Drawing Sheets

(51) Int. Cl.
*F01K 11/02* (2006.01)
*F01K 23/02* (2006.01)
*F02C 6/18* (2006.01)
*F02C 7/143* (2006.01)
*F01K 5/00* (2006.01)

(52) U.S. Cl.
CPC .............. *F01K 23/065* (2013.01); *F02C 6/18* (2013.01); *F02C 7/143* (2013.01); *F05D 2220/60* (2013.01); *F05D 2220/72* (2013.01); *F05D 2260/211* (2013.01); *F05D 2260/213* (2013.01); *F05D 2260/61* (2013.01); *Y02E 20/16* (2013.01)

(58) Field of Classification Search
CPC .. F01K 13/02; F02C 7/14–7/1435; F02C 6/18
USPC ......... 60/643, 645, 648, 655, 665, 667, 670, 60/676
See application file for complete search history.

(56) References Cited

U.S. PATENT DOCUMENTS

| | | | |
|---|---|---|---|
| 2,636,485 A * | 4/1953 | Hillier | F01K 9/023 122/451 R |
| 3,147,072 A | 9/1964 | Thomsen | |
| 3,289,402 A * | 12/1966 | Jung | F01K 7/40 60/39.182 |
| 3,489,652 A | 1/1970 | Williamson | |
| 3,953,966 A * | 5/1976 | Martz | F01K 13/02 60/39.182 |
| 3,955,358 A * | 5/1976 | Martz | F01K 13/02 122/451 S |
| 3,965,675 A * | 6/1976 | Martz | F01K 13/02 122/406.4 |
| 4,094,747 A | 6/1978 | Pfenninger | |
| 4,207,842 A * | 6/1980 | Kehlhofer | F22D 1/28 122/406.4 |
| 4,238,296 A | 12/1980 | Sadhukhan | |
| 4,310,387 A | 1/1982 | Sadhukhan | |
| 4,330,373 A | 5/1982 | Liu | |
| 4,751,814 A | 6/1988 | Farrell | |
| 4,896,499 A | 1/1990 | Rice | |
| 5,386,685 A * | 2/1995 | Frutschi | F01K 23/106 60/39.182 |
| 5,622,605 A | 4/1997 | Simpson et al. | |
| 5,678,401 A * | 10/1997 | Kimura | F01K 23/103 60/39.182 |
| 5,884,470 A * | 3/1999 | Frutschi | F01K 21/047 60/39.182 |
| 5,925,223 A | 7/1999 | Simpson et al. | |
| 5,952,223 A | 9/1999 | Kaplan et al. | |
| 6,223,523 B1 * | 5/2001 | Frutschi | F01K 21/042 60/39.182 |
| 6,224,716 B1 | 5/2001 | Yoder | |
| 6,833,056 B1 | 12/2004 | Kamiya et al. | |
| 7,197,876 B1 | 4/2007 | Kalina | |
| 7,269,956 B2 | 9/2007 | Gericke et al. | |
| 7,614,367 B1 | 11/2009 | Frick | |
| 7,698,323 B1 | 4/2010 | Rangan et al. | |
| 7,799,178 B2 | 9/2010 | Eddington | |
| 8,328,995 B2 | 12/2012 | Eddington | |
| 8,545,681 B2 | 10/2013 | Shapiro et al. | |
| 8,899,008 B2 | 12/2014 | Jones et al. | |
| 2003/0057165 A1 | 3/2003 | Carson | |
| 2003/0121856 A1 | 7/2003 | Voutchkov | |
| 2004/0237539 A1 | 12/2004 | Mangin | |
| 2005/0121532 A1 | 6/2005 | Reale et al. | |
| 2005/0235625 A1 * | 10/2005 | Gericke | F01K 7/40 60/39.182 |
| 2006/0076428 A1 * | 4/2006 | Knight | F22D 1/36 237/19 |
| 2006/0157338 A1 | 7/2006 | Eddington | |
| 2006/0157410 A1 | 7/2006 | Hassan | |
| 2007/0006565 A1 * | 1/2007 | Fleischer | B01D 53/1475 60/39.5 |
| 2007/0215453 A1 | 9/2007 | Eddington | |
| 2010/0326076 A1 | 12/2010 | Ast et al. | |
| 2011/0137892 A1 | 6/2011 | Bisson et al. | |
| 2011/0147195 A1 | 6/2011 | Shapiro et al. | |
| 2012/0048215 A1 * | 3/2012 | Hicks | D21F 5/20 122/1 C |
| 2012/0159923 A1 | 6/2012 | Freund et al. | |
| 2012/0216502 A1 | 8/2012 | Freund et al. | |
| 2013/0263928 A1 * | 10/2013 | Inoue | F22D 5/26 137/11 |
| 2013/0270100 A1 | 10/2013 | Kwak et al. | |
| 2016/0138798 A1 | 5/2016 | Assmann et al. | |

FOREIGN PATENT DOCUMENTS

| | | | |
|---|---|---|---|
| CN | 101384323 | 12/2013 | |
| DE | 849040 | 9/1952 | |
| EP | 1921281 | 5/2008 | |
| EP | 2345799 | 7/2011 | |
| EP | 2410153 A2 | 1/2012 | |
| EP | 2516334 | 10/2012 | |
| EP | 2630342 | 9/2014 | |
| EP | 2937542 A1 | 10/2015 | |
| JP | 59203812 A * | 11/1984 | ............ F01K 9/023 |
| WO | 2007095289 | 8/2007 | |
| WO | 2011014715 | 2/2011 | |
| WO | 2011078907 | 6/2011 | |
| WO | 2015/000536 A1 | 1/2015 | |

OTHER PUBLICATIONS

EP Extended Search Report; Application No. EP 16155182.5; dated Jul. 20, 2016; 7 pages.
U.S. Appl. No. 14/922,039, filed Oct. 23, 2015, Richard Michael Watkins.

* cited by examiner

SYSTEM AND METHOD FOR HEATING MAKE-UP WORKING FLUID OF A STEAM SYSTEM WITH ENGINE FLUID WASTE HEAT

BACKGROUND

The subject matter disclosed herein relates to steam systems, and more specifically to systems and methods for steam generation and heat recovery.

A steam system may include a steam generation unit to generate steam, which may be used in a variety of equipment such as a steam turbine or for plant process use or both. The steam generation unit may use water from a variety of sources, some of that being make-up water from outside the steam cycle. Unfortunately, the raw make-up water may include various corrosive substances and/or dissolved gases, which can impact the longevity and performance of the steam system. The make-up water also may be at a relatively low temperature (e.g., ambient temperature), thereby requiring a substantial amount of heat to facilitate ridding the water of dissolved gases. Such heat is typically supplied from steam extracted from a steam turbine or diverted from plant process use.

An engine, such as a gas turbine engine, may generate a considerable amount of waste heat. For example, the gas turbine engine may generate waste heat in the exhaust gas, lubricants, coolants, and/or compressed gas, such as a compressed oxidant (e.g., air). Unfortunately, much of the heat associated with these fluids are wasted (e.g., discharged into the atmosphere), thereby reducing the efficiency of the gas turbine engine.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system is provided. The system includes an engine and a heat exchanger coupled to the engine. The engine includes at least one of a compressor section configured to compress a gas, a lubricant path configured to circulate a lubricant, or a coolant path configured to circulate a coolant. The engine fluid comprises at least one of the gas, the lubricant, or the coolant. The engine fluid is a source of heat derived from one or more operations of the engine. The heat exchanger is configured to receive the engine fluid from the engine and exchange heat between the engine fluid and a working fluid to produce a heated working fluid and a cooled engine fluid, and the heat exchanger is configured to export the heated working fluid to a steam system.

In a second embodiment, a deaerator of a steam system is provided. The deaerator is configured to receive a heated working fluid exported from a heat exchanger coupled to at least one of a compressor section, a lubricant path, or a coolant path of an engine. The deaerator is configured to remove one or more corrosive substances and/or dissolved gases from the heated working fluid to produce a deaerated heated working fluid prior to steam generation in the steam system.

In a third embodiment, a method is provided. The method includes flowing a working fluid through a heat exchanger. The method also includes exchanging heat between the working fluid and an engine fluid from at least one of a compressor section, a lubricant path, or a coolant path of an engine to generate a heated working fluid and a cooled engine fluid. The method also includes exporting the heated working fluid from the heat exchanger to a steam system and producing, via the steam system, a steam supply utilizing at least a portion of the heated working fluid.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
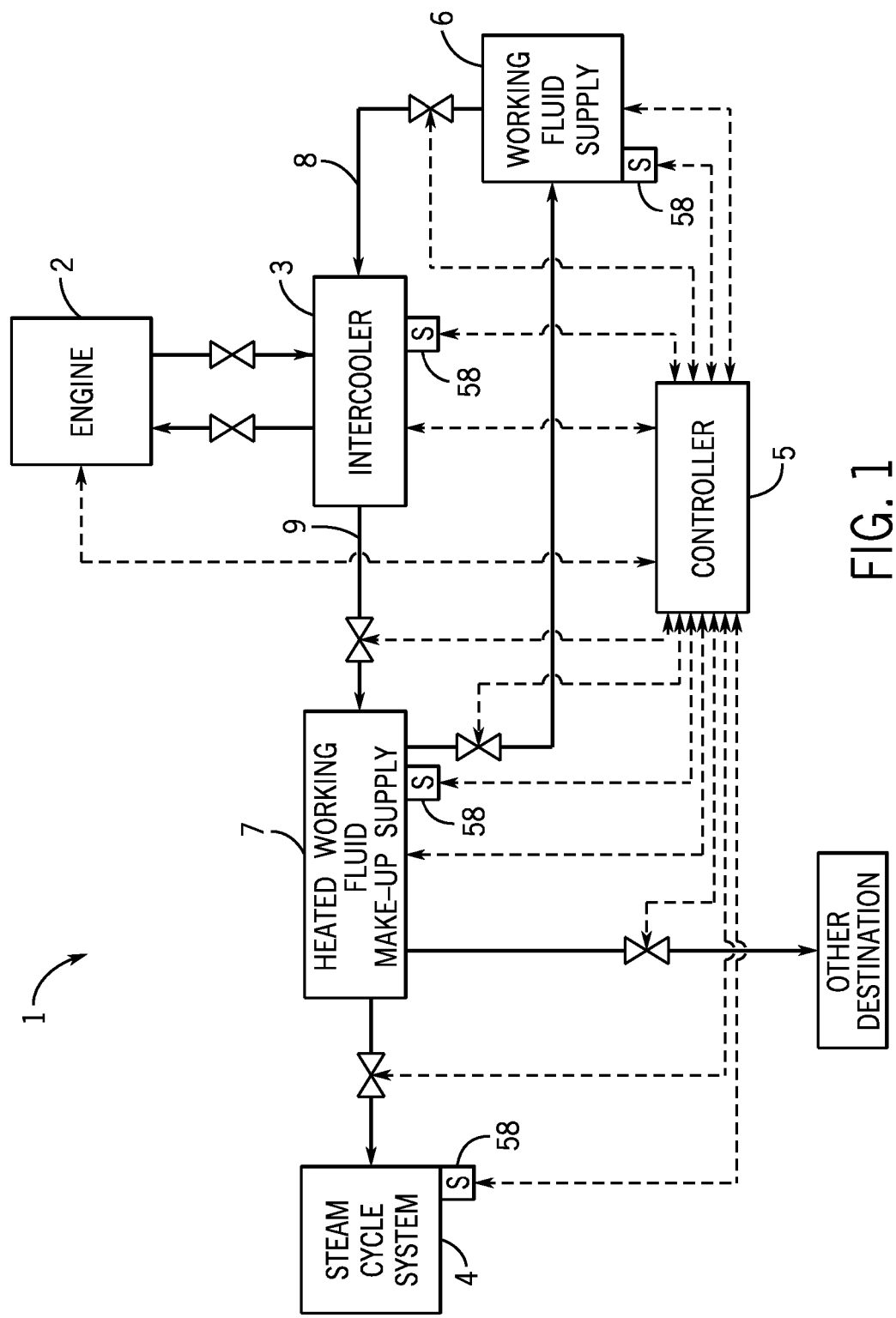
FIG. 1 is a schematic block diagram illustrating a combined cycle system having a steam cycle system, an engine, and an intercooler configured to utilize a working fluid supply, in accordance with embodiments of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed toward a combined cycle system having a steam cycle system, an engine, and an engine heat exchanger (e.g., intercooler) for various engine fluids (e.g., compressed gas, coolant, or lubricant). Specifically, the present disclosure includes an engine integrated with a heat exchanger (e.g., intercooler), where a working fluid of the intercooler is heated with waste heat generated by the engine (e.g., one or more engine fluids). Further, the heated working fluid is provided by the heat exchanger (e.g., intercooler) to the steam cycle system and is utilized by the steam cycle system to facilitate deaeration and generation of steam. Embodiments of the present disclosure are discussed in the context of a gas turbine engine and an intercooler thereof, although it should be noted that, in other embodiments in accordance with the present disclosure, a different type of engine with an accompanying intercooler may be integrated with the steam cycle system.

The disclosed embodiments may employ one or more engine heat exchangers (e.g., intercoolers) to transfer heat for cooling one or more engine fluids (e.g., compressed gas, coolant, or lubricant) while heating one or more working fluids (e.g., feed water). While the following discussion focuses primarily on the compressed gas (e.g., compressed oxidant) and compressor section of the engine as an example source of waste heat, other sources of waste heat are also contemplated by the present disclosure as noted above and discussed in further detail below. Present embodiments of the disclosure include a gas turbine engine that includes a compressor configured to compress oxidant (e.g., air) for use in a combustor (e.g., a combustion chamber) of the gas turbine engine. The compressed oxidant may be heated due to mechanical compression in the compressor. However, efficiency of the turbine engine is generally enhanced by cooling the compressed oxidant to a temperature that may be controlled before delivery to subsequent stages of the compression process before ultimately being delivered to the combustor for combustion. Accordingly, an intercooler may be used as a heat exchanger for the compressed oxidant. The compressed oxidant may be routed into the intercooler, where a working fluid (e.g., water, makeup water, coolant, etc.) is routed through coils or tubes in the intercooler and may extract heat from the compressed oxidant. The cooled compressed oxidant is delivered back to the compressor (e.g., subsequent stages of the compressor) at a temperature that may be controlled and further compressed and heated as it is delivered to the combustor of the turbine engine, and the heated working fluid may be routed from the intercooler to a steam cycle system, where the heated working fluid is used to produce steam. Accordingly, heat extracted from the compressed oxidant is recycled for use in the steam cycle system instead of being rejected to a heat sink and otherwise wasted, i.e., waste heat. Again, the disclosed embodiments also may employ waste heat from other engine fluids, such as an engine lubricant and/or engine coolant. Accordingly, waste heat re-claimed from the engine and used in the steam cycle to heat working fluid which is added as make-up water to the steam system replaces steam from the steam cycle that is typically used to heat the water within the steam system.

Turning now to the figures, FIG. 1 is a block diagram illustrating an embodiment of a combined cycle system 1 comprising an engine 2, an intercooler 3 (e.g., a heat exchanger), a steam cycle system 4, and a controller 5 (e.g., an electronic or processor-based controller). The engine 2 may be any type of engine that generates a hot fluid, which can be cooled to improve the efficiency of the engine 2. For example, the engine 2 may be a gas turbine engine, an internal combustion engine, or any type of heat engine. The gas turbine engine 2 may include one or more compressors or compression stages, one or more combustors or combustor stages, and one or more turbines or turbine stages. For example, the gas turbine engine 2 may be an industrial gas turbine engine or an aeroderivative gas turbine engine. The internal combustion engine 2 may include a reciprocating engine, which may include one or more pistons that reciprocate within a respective cylinder (e.g., 1-24 pistons in cylinders). The engine 2 also may be coupled to a load, such as an electrical generator in a power plant or industrial facility.

In the illustrated embodiment, the engine 2 may be coupled to the intercooler 3 (e.g., heat exchanger) to increase the efficiency of the engine 2. For example, the intercooler 3 may be configured to cool a hot fluid (e.g., gas, liquid, or both) of the engine 2 by transferring heat from the hot fluid to a working fluid 8 routed from a working fluid supply 6. The hot fluid may include a compressed gas (e.g., compressed oxidant, such as air, oxygen, oxygen-enriched air, or oxygen-reduced air), a lubricant (e.g., oil), a coolant fluid, or any combination thereof. In certain embodiments, the compressed gas may include exhaust gas recirculation (EGR) gas. However, in some embodiments, the hot fluid includes or excludes exhaust gas, such as exhaust gas output through an exhaust section of the engine 2 and/or EGR gas. The working fluid may include a liquid, a gas, or a combination thereof. For example, the working fluid 8 may include water, a water chemical mixture, fresh water, process water from various sources in an industrial plant such as a power plant, or any combination thereof.

The intercooler 3 may be an indirect heat exchanger, such as a shell and tube heat exchanger, a plate and shell heat exchanger, or any arrangement of fluid conduits or passages that enables the flow of the hot fluid in close proximity to the flow of working fluid 8, thereby exchanging heat between the hot fluid and the working fluid 8. For example, in certain embodiments, the hot fluid with the higher temperature may be directed from the engine 2 into an outer shell of the intercooler 3. Further, the hot fluid routed to the outer shell of the intercooler 3 may exchange heat with the working fluid 8 directed into a cooler inner tube of the intercooler 3. In this manner, the hot fluid may be cooled and rerouted into the engine 2, while the working fluid 8 is heated and exported from the intercooler 3. In certain embodiments, the heated working fluid 9 may be routed from the intercooler 3 to a heated working fluid make-up supply 7.

The working fluid supplies 6 and 7 may include a variety of components for flow control, flow distribution, and fluid treatment. The working fluid supply 6 may include a storage tank, a conduit, a freshwater source (e.g., a lake or river), a plant component (e.g., equipment in a power plant that provides a process fluid), a pump, a valve, a distribution manifold, a fluid treatment system (e.g., filter, solid-liquid separator, gas-liquid separator, and/or chemical absorber), or any combination thereof. Likewise, the heated working fluid make-up supply 7 may include a storage tank, a conduit, a pump, a valve, a distribution manifold, a fluid treatment system (e.g., filter, solid-liquid separator, gas-liquid separator, and/or chemical absorber), or any combination thereof.

In certain embodiments, the heated working fluid make-up supply 7 may route the heated working fluid 9 (e.g., heated water) to the steam cycle system 4, where the heated working fluid 9 is utilized by the steam cycle system 4 to produce steam. Accordingly, heat extracted from the hot fluid within the engine 2 is recycled for use in the steam cycle system 4 instead of being rejected to a heat sink and otherwise wasted, i.e., waste heat. In the steam cycle system 4, the heated working fluid 9 (e.g., heated water) may help reduce the heat requirement for certain processes and/or equipment, such as one or more deaerators configured to remove oxygen and other dissolved gases from the heated working fluid 9 prior to use in the steam cycle system 4. For example, without the disclosed embodiments, a source of heat (e.g., a non-waste heat such as live steam) may be required to pre-heat water prior to or during deaeration by one or more deaerators, thereby reducing the efficiency of the steam cycle system 4. The disclosed embodiments use waste heat from the engine 2 (e.g., waste heat from heated fluid other than the exhaust gas) to help pre-heat the working fluid 9 (e.g., heated water), thereby using otherwise wasted heat to increase the efficiency of the steam cycle system 4.

Accordingly, in certain embodiments, the working fluid supply 6 routed to the intercooler 3 may include types of fluids that are suitable for use in steam cycle systems 4 during the steam production process. For example, the steam cycle system 4 may compensate for water losses that naturally occur within the steam cycle system 4 with make-up water. In certain situations, make-up water is provided to steam cycle system 4 as replacement water which is combined with the feed water to continue the steam production processes of the steam cycle system 4. Without the disclosed embodiments, make-up water may be routed to the steam cycle system 4 at approximately ambient temperatures, and the steam cycle system 4 may pre-heat (e.g., with a non-waste source of heat such as steam) and/or pre-condition the make-up water before it is used within steam production process. For example, without the disclosed embodiments, the steam cycle system 4 may consume a portion of the steam produced by the system 4 to heat the make-up water before it can be utilized within the steam production process. However, utilizing steam produced by the steam cycle system 4 (and/or other heat within the steam cycle system 4) may reduce the overall efficiency of the steam cycle system 4. Indeed, in accordance with the presently disclosed embodiments, it may be beneficial to provide the steam cycle system 4 with an external source of make-up water that is pre-heated to the desired temperatures, thereby improving the efficiency of the steam cycle system 4 by reducing the need to utilize steam produced by the steam cycle system 4 to heat the make-up water. Accordingly, embodiments of the present disclosure include routing a make-up water supply (e.g., working fluid supply 6) to the intercooler 3, and heating the make-up water with waste heat extracted from the hot fluid within the engine 2. Further, embodiments of the present disclosure include exporting the heated make-up water (e.g., heated working fluid 9) to the steam cycle system 4, wherein the heated make-up water is combined with the feed water and then utilized by the steam cycle system 4 to produce steam.

In certain embodiments, the combined cycle system 1 includes the controller 5 configured to regulate and monitor the operations of the combined cycle system 1. Specifically, the controller 5 may be configured to monitor and control one or more parameters (e.g., flow rate and/or temperature) of the working fluid 8 flowing from the working fluid supply 6 into the intercooler 3, one or more parameters (e.g., flow rate and/or temperature) of the heated working fluid 9 flowing out of the intercooler 3 and into the steam cycle system 4, characteristics of the heat exchange within the intercooler 3 between the working fluid 8 and hot fluid of the engine 2, operations of the steam cycle system 4 (e.g., temperatures, flow rates, and pressures of water and steam), operations of the engine 2, and so forth. For example, the controller 5 may monitor and control the flow rate and temperature of heated working fluid 9 (e.g., heated water) supplied to the steam cycle system 4 based on one or more thresholds, such as upper and lower thresholds for flow rate, temperature, pressure, or any combination, for various processes and equipment (e.g., deaerators). In this manner, the controller 5 may be configured to regulate the various characteristics of the heated working fluid 9 provided to the steam cycle system 4, thereby regulating the steam production process of the steam cycle system 4. Likewise, the controller 5 may be configured to regulate the amount of heat exchange between the hot fluid of the engine 2 and the working fluid 8 by regulating the flow rates of these fluids into the intercooler 3.

Accordingly, as shown schematically in FIG. 1, the system 1 includes various flow control devices (e.g., adjustable valves, orifice plates, etc.) and sensors 58 (e.g., flow sensors, temperature sensors, pressure sensors, etc.) distributed throughout the system and coupled to the controller 5. For example, the system 1 may include one or more sensors 58 and valves coupled to, disposed in, disposed upstream from, or disposed downstream from the working fluid supply 6, the flow path (e.g., conduit) of working fluid 8, the intercooler 3, the flow paths (e.g., conduits) between the engine 2 and the intercooler 3, the flow path (e.g., conduit) between the intercooler 3 and the heated working fluid make-up supply 7, the heated working fluid make-up supply 7, the steam cycle system 4, the flow path (e.g., conduit) between the heated working fluid make-up supply 7 and the steam cycle system 4, a return path (e.g., conduit) from the heated working fluid make-up supply 7 to the working fluid supply 6, an output path (e.g., conduit) leading from the heated working fluid make-up supply 7 to another destination outside the system 1, or any combination thereof.

For example, the controller 5 may monitor various sensor feedback and control the valves to provide a certain flow rate and temperature of heated working fluid 9 to the steam cycle system 4, while also recycling a portion of the heated working fluid 9 back into the working fluid supply 6 and/or discharging a portion of the heated working fluid to the other destination. The recycled and/or discharged heated working fluid 9 may help regulate the temperature and flow rate of heated working fluid 9 used by the steam cycle system 4. In certain embodiments, each illustrated component may represent 1, 2, 3, 4, 5, 6, 7, 8, 9, 10, or more of the illustrated components, e.g., the engine 2, the intercooler 3, the steam cycle system 4, the working fluid supply 6, the heated working fluid make-up supply 7, or any combination thereof. Furthermore, in certain embodiments, each of the illustrated components may serve or function with one or more of the other illustrated components. For example, the engine 2, the intercooler 3, the working fluid supply 6, and the heated working fluid make-up supply 7 may be controlled by the controller 5 to provide heated working fluid 9 to 1, 2, 3, 4, 5, or more steam cycle systems 4. By further example, a plurality of engines 2, a plurality of intercoolers 3, a plurality of working fluid supplies 6, and/or a plurality of heated working fluid supplies 7 may be controlled by the controller 5 to provide heated working fluid 9 to the steam cycle system 4. In some embodiments, the system 1 may include a plurality of chains of working fluid supplies 6, intercoolers 3, and heating working fluid make-up supplies 7 with the same or different working fluids, such as water, a lubricant such as oil, a cooling liquid, or any combination thereof. Although the disclosed embodiments may include any number and configuration of the illustrated components, for purposes of simplicity in the following discussion, reference may be made to only one working fluid (e.g., water) and/or only one set of the illustrated components.

Figure 2:
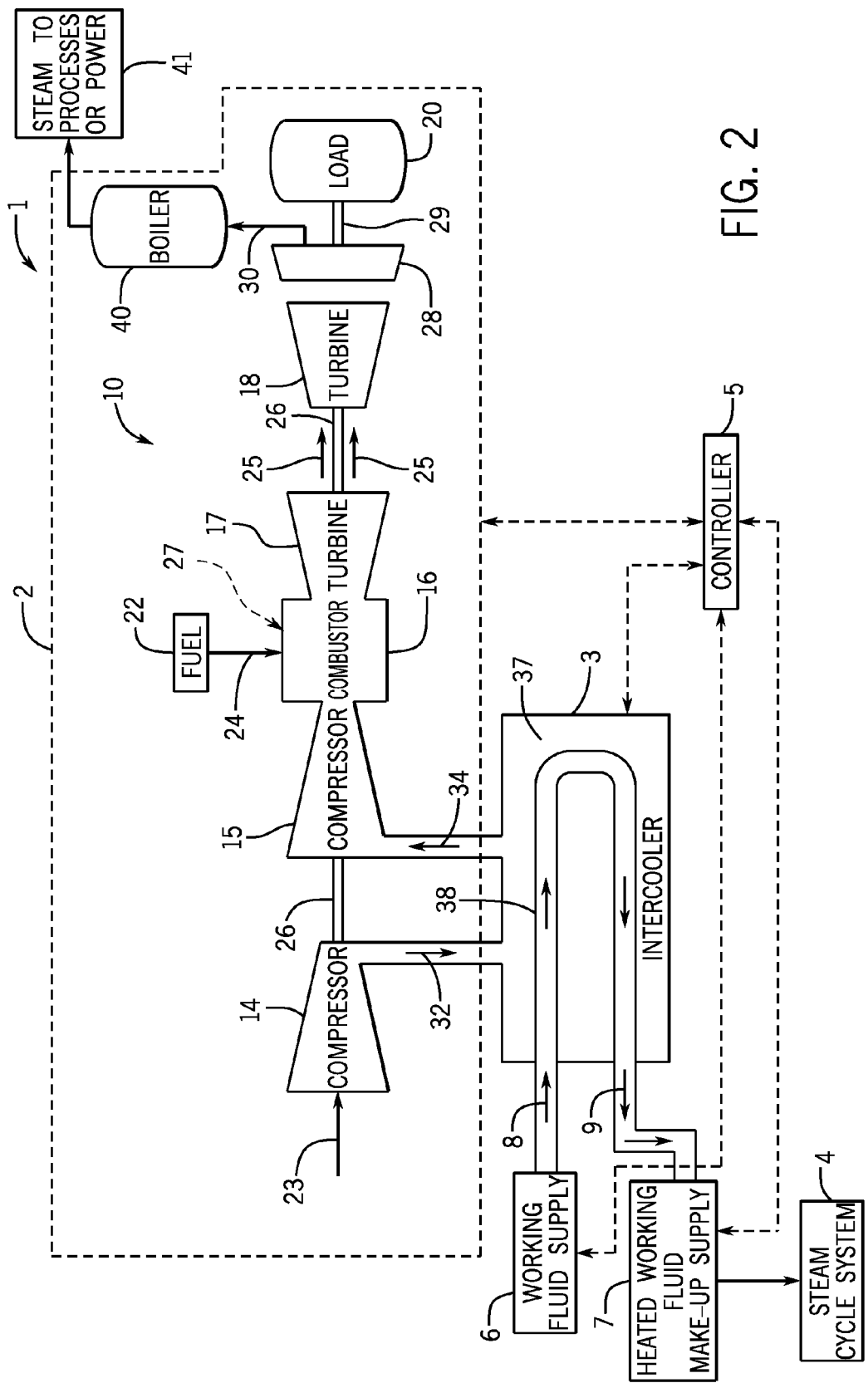
FIG. 2 is a schematic block diagram illustrating an embodiment of the engine and the intercooler of FIG. 1, in accordance with embodiments of the present disclosure.

FIG. 2 is a block diagram illustrating an embodiment of the engine 2 and the intercooler 3 of FIG. 1. Specifically, in the illustrated embodiment, the engine 2 includes a gas turbine engine 10 coupled to the intercooler 3. It should be noted, however, that in other embodiments, the engine 2 may be any specific type of engine (e.g., a combustion turbine, an internal combustion engine, or other heat engine) that is integrated with an accompanying intercooler 3.

In the illustrated embodiment, the gas turbine engine 10 includes a compressor section having a plurality of compressor stages (e.g., a first compressor or compressor first stage 14 and a second compressor or compressor second stage 15), a combustor section having one or more combustors 16 (e.g., combustion chambers), and a turbine section having a plurality of turbine stages (e.g., a first turbine or turbine first stage 17 and a second turbine or turbine second stage 18). The illustrated gas turbine engine 10 is also coupled to a load 20 (e.g., driven device), such as an electrical generator or a mechanical device in an industrial facility or power plant. Each combustor 16 includes one or more fuel nozzles 22, which route fuel 24 (e.g., gaseous or liquid fuel), such as natural gas, syngas, or petroleum distillates, into the combustor 16. In certain embodiments, the gas turbine engine 10 may include multiple combustors 16 (e.g., 1 to 10 or more), each with one or more fuel nozzles 22 (e.g., 1 to 6 or more).

In the illustrated embodiment, the combustor 16 combusts a fuel from the fuel nozzles 22 with a compressed oxidant 23 (e.g., air, oxygen, oxygen-enriched air, or oxygen-reduced air) from the compressor section (e.g., compressor stages 14, 15), and routes hot pressurized combustion gases 25 (e.g., combustion products) to the turbine section (e.g., turbine stages 17, 18). The turbine second stage 18 is coupled to a first shaft 26 and the turbine first stage 17 is coupled to a second shaft 27, where the second shaft 27 is hidden in the illustrated embodiment by the combustor 16. The first shaft 26 is also coupled to the compressor first stage 14, and the second shaft 27 is also coupled to the compressor second stage 15. As the combustion gases 25 (e.g., combustion products) pass through the turbine blades in the turbine first and second stages 17, 18, the turbine stages 17, 18 are driven into rotation, which causes the shafts 27, 26, respectively, to rotate, where the shafts 27, 26 are, as described above, coupled to the compressor section (e.g., compressor stages 15, 14). Thus, the turbine blades extract work from the combustion gases 25, such that the turbine stages 17, 18 drive the compressor stages 15, 14, respectively, via the shafts 27, 26, respectively.

Further, the combustion gases 25 exit the turbine second stage 18 as exhaust gas and enter into a third turbine or turbine stage 28, driving turbine blades of the third turbine 28. The third turbine 28 is coupled to the load 20 via a third shaft 29. Accordingly, the third turbine 28 extracts work from the exhaust gas to drive the load 20, and the exhaust gas exits the engine 10 via an exhaust gas outlet 30. In certain embodiments, a boiler 40 may be configured to receive the exhaust gas from the exhaust gas outlet 30 and be supplied with feed water to generate steam that may be routed to various processes or power systems (block 41). The load 20 (e.g., driven device) may be any suitable device that may generate power via the rotational output of the gas turbine engine 10, such as a power generation plant or an external mechanical load. For example, the load 20 may include an electrical generator, a compressor of a process gas, and so forth.

In an embodiment of the gas turbine engine 10, compressor blades are included as components of the compressor stages 14, 15. The blades within the compressor stages 14, 15 are coupled to the shafts 27, 26, such that the compressor blades will rotate as the shafts 27, 26 are driven to rotate by the turbine stages 17, 18, as described above. The rotation of the blades within the compressor stages 14, 15 causes compression of the oxidant 23 (e.g., air) entering the compressor stages 14, 15, thereby generating compressed oxidant 32 (e.g., air). Due to mechanical compression of the oxidant 23 (e.g., air) in the compressor stages 14, 15, the compressed oxidant 32 (e.g., air) is generally elevated in temperature (e.g., relatively hot). For example, compressed oxidant 32 (e.g., air) exiting the compressor first stage 14 is generally heated due to the work of mechanical compression in the compressor first stage 14. However, efficiency of the gas turbine engine 10 is enhanced by delivering cooled compressed oxidant 34 (e.g., air) to be further compressed in subsequent compressor stages (e.g., the compressor second stage 15), where the cooled compressed oxidant 34 (e.g., air) delivered to the compressor second stage 15 will be compressed and heated again before deliver to the combustor 16.

Accordingly, in certain embodiments, the compressed oxidant 32 (e.g., air) may be routed into a shell 37 (e.g., cooling chamber or cooling passage) of the intercooler 3 of the gas turbine engine 10 from the compressor first stage 14. Further, the working fluid 8 (e.g., make-up water) may be routed from the working fluid make-up supply 7 into an inner tube(s) 38 (e.g., coil, cooling chamber, or cooling passage) of the intercooler 3. For example, the working fluid 8 may be cooled below ambient temperature and/or at an ambient temperature (e.g., approximately between 10° to 25° Celsius) and is routed through the inner tube(s) 38. In certain embodiments, the working fluid 8 may be any type of fluid that may be utilized by the steam cycle system 4, such as make-up water. The compressed oxidant 32 (e.g., air) may be at higher temperatures (e.g., approximately between 50° to 300° Celsius). Heat is exchanged between the compressed oxidant 32 (e.g., air) within the shell 37 of the intercooler 3 and the working fluid 8 within the inner tube(s) 38. In certain embodiments, a leakage blocking feature (e.g., seals, gaskets, fasteners, etc.) may be disposed within the intercooler 3 between the inner tube(s) 38 and the shell 37 to block fluid flow between the inner tube(s) 38 and the shell 37. The inner tube(s) 38 and/or the shell 37 may also be configured to expand and contract, in certain situations, to suitably receive and exchange heat between higher and lower temperatures and fluids.

In this manner, the working fluid 8 extracts heat from the compressed oxidant 32 (e.g., air) to generate cooled compressed oxidant 34 (e.g., air) and the heated working fluid 9. The heated working fluid 9 may be at temperatures between approximately 80° Celsius and 500° Celsius. In certain embodiments, the heated working fluid 9 may be at temperatures between approximately 80° C. and 500° C., 90° C. and 400° C., 110° C. and 300° C., or 150° C. and 200° C. Further, in certain embodiments, the heated working fluid 9 may be greater than 70° C., 80° C., 90° C., 100° C., 110° C., 120° C., 130° C., 140° C., 150° C., 160° C., 170° C., 180° C., 190° C., 200° C., 225° C., 250° C., 300° C., 400° C., or 500° C. The cooled compressed oxidant 34 (e.g., air) may be at temperatures between approximately 20° C. and 300° C., 30° C. and 90° C., 40° C. and 80° C., or 50° C. and 70° C. The cooled compressed oxidant 34 may be then delivered to the compressor second stage 15 at a controlled temperature for additional compression and heating before being sent to the combustor 16, and the heated working fluid 9 exits the intercooler 3 at a higher temperature than the working fluid 8 was when it entered the intercooler 3. In certain embodiments, the heated working fluid 9 may be extracted from the intercooler 3 and routed to the heated working fluid make-up supply 7 in order to control the outlet temperature of the compressed oxidant 34 returning to the next stage of compression 15. Without the disclosed embodiments, the heated working fluid 9 may deposit heat in a heat sink, such that the heated working fluid 9 can be delivered back to the intercooler 3 at a desired (e.g., lower) temperature. However, it would be advantageous to recycle heat extracted by the working fluid 8 from the compressed oxidant 32 (e.g., air) by exporting the heated working fluid 9 to some other system or component external to the gas turbine engine 10, where the heat may be utilized to perform some other role or function. For example, in certain embodiments, the heated working fluid 9 may be exported to the steam cycle system 4, where the heated working fluid 9 may be used for steam production, as further described with respect to FIGS. 3 and 4. Specifically, the heated working fluid 9 exported to the steam cycle system 4 may be a heated make-up water that may be utilized by the steam cycle system 4 as a source of pre-heated replacement feed water for the steam production processes, as further described with respect to FIGS. 3 and 4.

Figure 4:
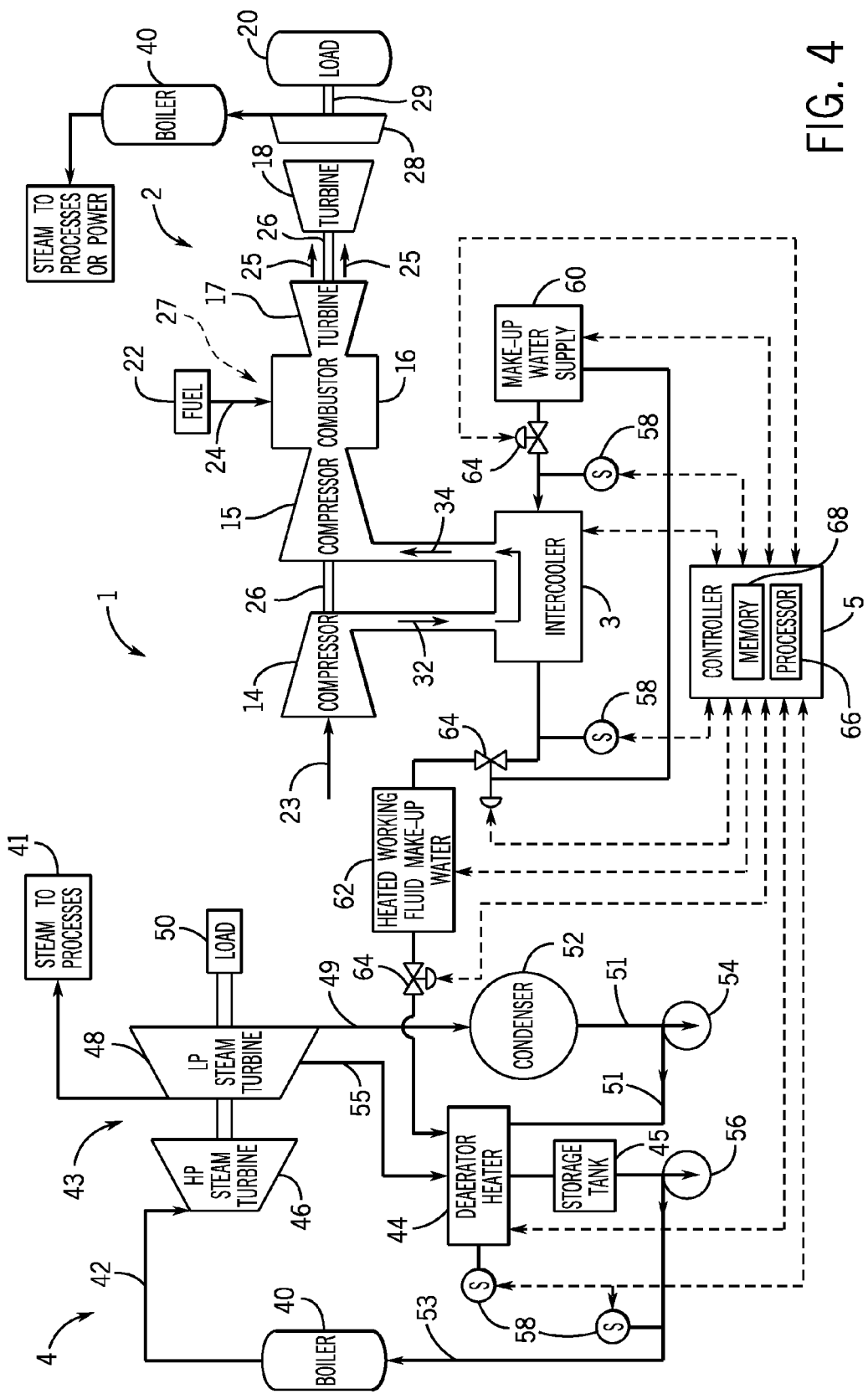
FIG. 4 is a schematic block diagram illustrating an embodiment of the intercooler exporting a heated working fluid into the steam cycle system of FIG. 1, in accordance with embodiments of the present disclosure.

In certain embodiments, the controller 5 may be configured to monitor and control various characteristics of the intercooler 3, the working fluid supply 6 and the working fluid 8, the heated working fluid make-up supply 7 and the heated working fluid 9, and the engine 2, as further described with respect to FIG. 4. Specifically, in certain embodiments, the controller 5 may control one or more valves to regulate the flow rate and residence time of the working fluid 8 from the working fluid supply 6 through the intercooler 3, while also controlling one or more valves to regulate the flow rate and residence time of the oxidant (e.g., 32, 34) through the intercooler 3. By controlling flow rates and residence times in the intercooler 3, the controller 5 may control the heat transfer to provide a suitable reduction in temperature of the oxidant (e.g., 32, 34) and a suitable increase in temperature of the working fluid (e.g., 9). Likewise, the controller 5 may control one or more valves to regulate the flow rate of the heated working fluid 9 routed from the intercooler 3 to the heated working fluid make-up supply 7 and/or the steam cycle system 4, such as by controlling the portions of heating working fluid 9 recycled to the working fluid supply 6 and/or discharged to the other destination. In this manner, the controller 5 may be configured to regulate the production (e.g., flow rate and temperature) of heated working fluid 9 generated by the intercooler 3 and the distribution (e.g., split or proportions) of the heated working fluid 9 flowing to the steam cycle system 4, the working fluid supply 6, and the other destination. In certain embodiments, the controller 5 may also be configured to monitor the working fluid supply 6 and/or the heated working fluid make-up supply 7 to maintain a dynamic and/or continuous flow of heated working fluid 9 from the intercooler 3. In certain embodiments, the controller 5 may regulate and monitor various characteristics (e.g., temperature, pressure, flow rate, etc.) of the heated working fluid 9 exported from the intercooler 3, and may control various flows into the intercooler 3 to adjust or maintain specific desired characteristics of the heat exchange, as further described with respect to FIG. 4.

Figure 3:
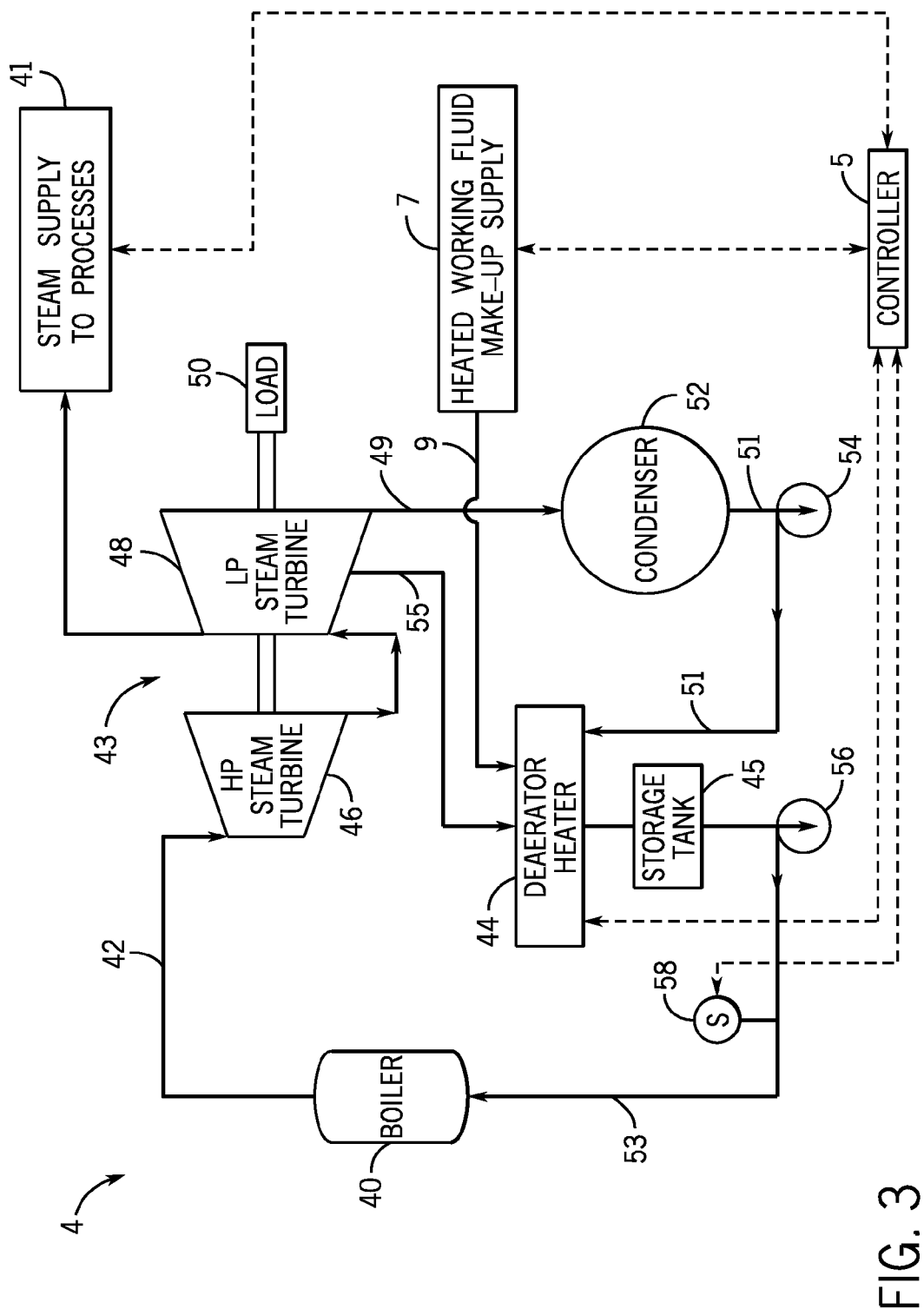
FIG. 3 is a schematic block diagram illustrating an embodiment of the steam cycle system of FIG. 1, in accordance with embodiments of the present disclosure.

FIG. 3 is a schematic block diagram illustrating an embodiment of the steam cycle system 4 of FIG. 1, in accordance with embodiments of the present disclosure. Specifically, the steam cycle system 4 may be configured to generate steam to drive a steam turbine system 43 and/or deliver a supply of steam to various processes 41. In the illustrated embodiment, the heated working fluid make-up supply 7 (e.g., heated with waste heat from the engine 2) may be utilized by the steam cycle system 4 during the steam production process. Specifically, in the illustrated embodiment, the heated working fluid make-up supply 7 may be a pre-heated source of make-up water that is added to the feed water to be utilized by the steam cycle system 4 to replace water losses that naturally occur during the steam cycle system 4. In particular, it should be noted that the heated working fluid make-up supply 7 may be provided to the steam cycle system 4 at elevated temperatures utilized by the steam cycle system 4, e.g., suitable for certain components (e.g., deaerator heater 44) without requiring further heating using non-waste heat, such as extracted steam 55 generated by the steam cycle system 4 and extracted from the turbine whereupon it can no longer produce further power. In this manner, the steam cycle system 4 may reduce the amount of extracted steam 55 otherwise consumed by the steam cycle system 4 to pre-heat the working fluid 9 and/or condensate 51 (e.g., collectively heated working fluid or feed water 53) to appropriate temperatures, thereby improving the efficiency of the steam cycle system 4 during steam production.

In certain embodiments, the steam cycle system 4 may include a boiler 40 (e.g., steam generating boiler) that produces and outputs steam 42 into the steam turbine system 43 having a high pressure steam turbine section 46 (e.g., HP steam turbine 46) and/or a low pressure steam turbine section 48 (e.g., LP steam turbine 48). The steam turbine system 43 also may include a medium pressure steam turbine section (e.g., MP steam turbine). In certain embodiments, the steam 42 output by the boiler 40 may be high-pressure, high-temperature steam that enters the HP steam turbine 46 section of the steam turbine system 43. The steam turbine system 43 may utilize the steam 42 to drive a load 50. The load 50 may be an electrical generator for generating electrical power. It should be noted that although the gas turbine engine 10 and the steam turbine system 43 may drive separate loads 20, 50 respectively. In certain embodiments, the gas turbine engine 10 and the steam turbine system 43 may be utilized in tandem to drive a single load via a single shaft.

Further, in certain embodiments, during operation of the steam turbine system 43, the steam turbine system 43 may generate exhaust 49, which may include low-pressure steam and/or condensed water. For example, exhaust 49 from the LP steam turbine 48 may be directed into a condenser 52. The condenser 52 may utilize a cooling tower or other type of heat sink to exchange the heated water output from the condenser 52 for cooled water, which also aids in the condensation process. In certain embodiments, condensate 51 from the condenser 52 may, in turn, be directed into the boiler 40. In the illustrated embodiment, the condensate 51 from the condenser 52 is routed into a deaerator heater 44 via a hotwell pump 54, prior to being delivered to the boiler 40. The deaerator heater 44 may include a tray-type deaerator, a spray-type deaerator, or a combination thereof. For example, the deaerator heater 44 may include an enclosure having one or more spray heads (e.g., a spray header), a plurality of trays disposed in a vertically stacked arrangement, or a combination thereof. The deaerator heater 44 may include a steam section using steam 55 and a heated fluid section using the heated working fluid 9 from the heated working fluid make-up supply 7. The heat from the steam 55 and/or the heated working fluid 9 facilitates heating of the condensate 51 and/or heated working fluid 9 to the saturation temperature, thereby helping to strip out dissolved gases in the fluids 51, 9. The dissolved gases may then exit through a vent in the enclosure of the deaerator heater 44. The deaerator heater 44 route the treated condensate 51 and/or heated working fluid 9 to a storage tank 45 configured to store a supply of the treated heated working fluid 9 (e.g., the heated working fluid 53, the heated feed water 53).

The deaerator heater 44 may be configured to remove various corrosive compounds and/or dissolved gases (e.g., oxygen, carbon dioxide, etc.) from the heated working fluid 9 and condensate 51 to generate a treated heated working fluid 53 (e.g., cleaned or deaerated feed water) that is then routed to the boiler 40. Indeed, it may be beneficial to remove these corrosive compounds and/or dissolved gases, so that the heated working fluid 53 (e.g., feed water) does not cause corrosive damage or wear within the boiler 40 (e.g., steam generating boiler 40). In particular, the heated working fluid 9 may be routed to the deaerator heater 44 at the temperatures suitable for deaeration of the heated working fluid 9 and condensate 51. As noted above, in the illustrated embodiment, the heated working fluid 9 may be make-up water that is pre-heated via an external source (e.g., the intercooler 3 coupled to the engine 2). The heated working fluid 9 may be heated to an elevated temperature above the temperature of the condensate 51, such that heated working fluid 9 may facilitate heat transfer to the condensate 51. For example, the heated working fluid 9 may help to heat the condensate 51 to the saturation temperature, thereby helping to strip out dissolved gases in the fluids 51, 9 in the deaerator 45. In certain embodiments, the heat provided by the heated working fluid 9 may partially, substantially, or completely replace the use of extraction steam 55 as a source of heat for heating the condensate 51 to facilitate deaeration in the deaerator 45. For example, the heated working fluid 9 may replace at least 50, 60, 70, 80, 90, 95, or 100 percent of the steam 55 used in the deaerator 45. In certain embodiments, the heated working fluid 9 may be at temperatures between approximately 80° Celsius and 500° Celsius, such that the steam cycle system 4 does not need to heat (or pre-heat) the condensate 51 (and the heated working fluid 9) from ambient temperatures before it is routed to the deaerator heater 44. For example, the temperature of the heated working fluid 9 may be at least equal to or greater than approximately 70, 80, 90, 100, 110, 120, 130, 140, 150, 160, 170, 180, 190, 200, 300, 400, or 500° Celsius. The controller 5 may regulate the temperature and flow rate of the heated working fluid 9 into and through the deaerator heater 44, such that minimal or no additional heat is needed to deaerate the condensate 51 from the condenser 52 and the heated working fluid 9 from the heated working fluid make-up supply 7. In certain embodiments, the heated working fluid 53 (e.g., deaerated working fluid including the heated working fluid 9 and/or the condensate 51) may be routed to the boiler 40 via a feed pump 56. As noted above, the boiler 40 may be configured for steam generation.

In certain embodiments, the controller 5 may be configured to monitor and control various characteristics of the steam cycle system 4, the quantity of steam produced, and/or the heated working fluid make-up supply 7, as further described with respect to FIG. 4. Specifically, in certain embodiments, the controller 5 may be configured to dynamically monitor and/or regulate the amount of heated working fluid 9 that the steam cycle system 4 demands, and route an appropriate amount of the heated working fluid 9 into the deaerator heater 44. In certain embodiments, the controller 5 may be configured to route the heated working fluid 9 into the steam cycle system 4 based on sensor feedback from one or more sensors 58 (e.g., flow sensor, temperature sensors, water level sensors, etc.) that provide information related to the demand for feed water (e.g., heated working fluid 9) in the steam cycle system 4. The sensors 58 may be disposed anywhere within the steam cycle system 4, such as along flow paths and/or within components of the steam cycle system 4 (e.g., deaerator heater 44).

FIG. 4 is a schematic block diagram illustrating an embodiment of the combined cycle system 1 of FIG. 1. Specifically, in the illustrated embodiment, the intercooler 3 is configured to heat a supply of make-up water 60 by transferring heat from the hot compressed air (e.g., a hot fluid) of the engine 2 to the make-up water 60. Further, in the illustrated embodiment, a heated make-up water 62 may be routed from the intercooler 3 and into the steam cycle system of FIG. 1, where the heated make-up water 62 may be added to other water streams inside the steam cycle such as condensate 51 to be utilized for steam production. Indeed, as noted above, it may be beneficial to provide the steam cycle system 4 with an external source of heated make-up water 62 that is pre-heated to the desired temperatures. For example, in the illustrated embodiment, the heated make-up water 62 is routed to the deaerator heater 44 from the intercooler 3 at temperatures suitable for deaeration (e.g., at an elevated temperature between approximately 80° Celsius and 500° Celsius or greater). Accordingly, the steam cycle system 4 may not be needed to heat (or pre-heat) the heated make-up water 62 and/or condensate 51 from approximately ambient temperatures (e.g., approximately between 10° to 25° Celsius) before it is routed to the deaerator heater 44. In this manner, the intercooler 3 may be configured to utilize waste heat from the engine 2 to provide the heated make-up water 62 to the steam cycle system 4, thereby improving the efficiency of the steam cycle system 4 by reducing the need to utilize extracted steam 55 produced by the steam cycle system 4 to pre-heat the make-up water utilized by the system.

In certain embodiments, the controller 5 may be configured to regulate and/or monitor the demands and/or operations of the combined cycle system 1. Specifically, the controller 5 may be configured to monitor a flow (e.g., flow rates) of the make-up water 60 into the intercooler 3, the flow (e.g., flow rates) of the heated make-up water 62 out of the intercooler 3 and into the steam cycle system 4, characteristics of the heat exchange within the intercooler 3 between the make-up water 60 and the hot fluid of the engine 2, the amount of compressed oxidant 32 (e.g., air) routed to the intercooler 3 from the gas turbine engine 10, temperatures of the make-up water 60 and/or the heated make-up water 62, and so forth. In this manner, the controller 5 may be configured to regulate the various characteristics of the heated make-up water 62 provided to the steam cycle system 4, thereby regulating the steam production process of the steam cycle system 4. For example, in certain embodiments, the controller 5 may be configured to dynamically monitor and/or regulate the amount of heated make-up water 62 that the steam cycle system 4 demands, and route an appropriate amount of the heated make-up water 62 into the deaerator heater 44. It should be noted that various flow control devices 64 (e.g., valves, orifice plates, etc.) and/or sensors 58 (e.g., flow sensor, temperature sensors, etc.) may be disposed within the system 1 and utilized by the controller 5 to regulate the intercooler 3 and the amount of heated make-up water 62 routed into the steam cycle system 4.

In certain embodiments, based on sensor feedback from one or more sensors 58 disposed within the system 1, the controller may be configured to dynamically adjust (e.g., control) one or more operating parameters of the make-up water 60, the intercooler 3, and/or the heated make-up water 62. For example, in certain embodiments, the controller 5 may be configured to open or close one or more flow control devices 64 (e.g., adjustable valves) to adjust a flow rate of the make-up water 60 through the intercooler 3. Adjusting the flow rate of the make-up water 60 through the intercooler 3 may adjust the temperature of the make-up water 60 and/or adjust the quantity of the heated make-up water 62 routed to the deaerator heater 44. In certain embodiments, based on the flow rate of the make-up water routed to the boiler 40 from the deaerator heater 44 and/or the production rate of the steam, the controller 5 may be configured to open or close one or more flow control devices 64 to adjust the flow rate of the heated make-up water 62 into the deaerator heater 44. Indeed, if the quantity of the heated make-up water 62 exported from the intercooler 3 is greater than the demand of the heated make-up water 62 in the deaerator heater 44, the controller 5 may open or close one or more flow control devices 64 disposed between the intercooler 3 and the deaerator heater 44 to route the heated make-up water 62 to the supply of the make-up water 60. In this manner, the controller 5 may dynamically control and/or regulate the flow (e.g., flow rates) of the make-up water 60 and/or the heated make-up water 62 based on the demand of the make-up water 60 and/or the heated make-up water 62 within the system 1. It should be noted that the controller 5 may be configured to regulate and/or monitor both the steam cycle system 4 and the gas turbine engine 10 in order to control or adjust the operating parameters (e.g., flow rates, temperatures, etc.) of the make-up water 60, the intercooler 3, and/or the heated make-up water 62.

In certain embodiments, the controller 5 may include various components to regulate and/or monitor the demands and/or operations of the combined cycle system 1. For example, the controller 5 may include a processor 66 and a memory 68. As depicted, the processor 66 and/or other data processing circuitry may be operably coupled to memory 68 to retrieve and execute instructions for monitoring and controlling the system 10. For example, these instructions may be encoded in programs or software that are stored in memory 68, which may be an example of a tangible, non-transitory computer-readable medium, and may be accessed and executed by the processor 66 to allow for the presently disclosed techniques to be performed. The memory 68 may be a mass storage device, a FLASH memory device, removable memory, or any other non-transitory computer-readable medium. Additionally and/or alternatively, the instructions may be stored in an additional suitable article of manufacture that includes at least one tangible, non-transitory computer-readable medium that at least collectively stores these instructions or routines in a manner similar to the memory 68 as described above.

Technical effects of the invention include the combined cycle system 1 including the steam cycle system 4, the engine 2 (e.g., gas turbine engine 10), and the intercooler 3 coupled to the engine 2. Specifically, the intercooler 3 may be used as a heat exchanger that transfer heat from a hot fluid of the engine 2 (e.g., compressed air, lubricant such as oil, coolant, or other fluid with waste heat) to the working fluid 9 (e.g., make-up water). The heated working fluid 9 may be routed to the steam cycle system 4, and may be utilized during the steam production processes instead of being rejected to a heat sink and otherwise wasted, i.e., waste heat. Specifically, in certain embodiments, the working fluid 9 may be make-up water 60 that is utilized by the steam cycle system 4 as pre-heated replacement water for feed water and/or steam losses that occur within the steam cycle system 4. In this manner, the steam cycle system 4 may reduce the amount of steam 55 otherwise consumed by the steam cycle system 4 to pre-heat the make-up water to appropriate temperatures, thereby improving the overall efficiency of the steam cycle system 4 during steam production. Furthermore, in certain embodiments, the combined cycle system 1 includes the controller 5 that is configured to monitor and/or control various operating parameters (e.g., flow rates, temperatures, etc.) of the working fluid 9 (e.g., make-up water 60) and/or the heated working fluid 9 (e.g., heated make-up water 62) via one or more sensors 58 or flow control devices 64. For example, in certain embodiments, the controller 5 may be configured to dynamically monitor and/or regulate the amount of heated make-up water 62 that the steam cycle system 4 demands, and route an appropriate amount of the heated make-up water 62 into the deaerator heater 44.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a combustion engine comprising an engine fluid and at least one of a compressor section configured to compress a gas, a lubricant path configured to circulate a lubricant, or a coolant path configured to circulate a coolant, wherein the engine fluid comprises at least one of the gas, the lubricant, or the coolant, and wherein the engine fluid is a source of heat derived from one or more operations of the combustion engine;
a heat exchanger coupled to the combustion engine, wherein the heat exchanger is configured to receive the engine fluid from the combustion engine along an engine fluid path and exchange heat between the engine fluid and a working fluid along a working fluid path to produce a heated working fluid and a cooled engine fluid, the system is configured to split the heated working fluid produced by the heat exchanger into first and second flow paths upstream from a deaerator of a steam system, the first flow path is configured to direct a first portion of the heated working fluid to the deaerator and the steam system, the second flow path is configured to return a second portion of the heating working fluid to the working fluid path that passes through the heat exchanger, and the steam system is configured to receive the heated working fluid from the heat exchanger as a make-up water supply of working fluid to replace working fluid lost within a process of the steam system; and
a controller configured to selectively regulate a first flow of the first portion of the heated working fluid and a second flow of the second portion of the heated working fluid simultaneously and based on sensor feedback, wherein the first flow replaces at least 80 percent of a turbine extraction steam to facilitate deaeration in the deaerator.

2. The system of claim 1, wherein the deaerator is configured to receive the first portion of the heated working fluid from the heat exchanger and remove at least one of one or more corrosive substances and/or dissolved gases from the first portion of the heated working fluid to produce a deaerated heated working fluid.

3. The system of claim 2, wherein the steam system comprises:

a boiler configured to receive the deaerated heated working fluid from the deaerator to generate a steam; and
a steam turbine coupled to the boiler, wherein the steam turbine is configured to drive a load using at least the steam.

4. The system of claim 1, wherein the combustion engine comprises a gas turbine engine.

5. The system of claim 1, wherein the combustion engine comprises the compressor section configured to compress the gas, and the engine fluid comprises the gas.

6. The system of claim 5, wherein the gas comprises an oxidant.

7. The system of claim 1, wherein the combustion engine comprises the lubricant path configured to circulate the lubricant, and the engine fluid comprises the lubricant.

8. The system of claim 1, wherein the combustion engine comprises the coolant path configured to circulate the coolant, and the engine fluid comprises the coolant.

9. The system of claim 1, wherein the system is configured to direct all of the deaerated heated working fluid to a boiler of the steam system.

10. The system of claim 1, wherein the controller is configured to regulate the temperature of the heated working fluid to be at least approximately 90 degrees Celsius.

11. A system, comprising:
a deaerator of a steam system, wherein the deaerator is configured to receive a heated working fluid exported from a heat exchanger coupled to at least one of a compressor section, a lubricant path, or a coolant path of a combustion engine, wherein the deaerator is configured to remove one or more corrosive substances and/or dissolved gases from the heated working fluid to produce a deaerated heated working fluid prior to steam generation in the steam system, wherein the system is configured to direct all of the deaerated heated working fluid produced by the deaerator to a boiler of the steam system, and wherein the received heated working fluid from the heat exchanger is a make-up water supply of working fluid to replace working fluid lost within a process of the steam system, wherein the deaerator is configured to receive the heated working fluid;
wherein the system is configured to split the heated working fluid produced by the heat exchanger into first and second flow paths upstream from the deaerator of the steam system, the first flow path is configured to direct a first portion of the heated working fluid to the deaerator and the steam system, and the second flow path is configured to return a second portion of the heating working fluid to a working fluid path that passes through the heat exchanger; and
a controller configured to selectively regulate a first flow of the first portion of the heated working fluid and a second flow of the second portion of the heated working fluid simultaneously and based on sensor feedback, wherein the first flow replaces at least 80 percent of a turbine extraction steam to facilitate deaeration in the deaerator.

12. The system of claim 11, comprising the heat exchanger coupled to the deaerator.

13. The system of claim 11, comprising:
the boiler configured to receive all of the deaerated heated working fluid from the deaerator, wherein the boiler generates a steam based on heat exchange between the deaerated heated working fluid and an exhaust gas from the combustion engine; and
a steam turbine coupled to the boiler, wherein the steam turbine is configured to drive a load with the steam.

14. The system of claim 11, comprising the combustion engine, wherein the combustion engine comprises a gas turbine engine having the heat exchanger coupled to a first compressor section and a second compressor section of the gas turbine engine, and the heat exchanger is configured to cool a compressed gas between the first and second compressor sections.

15. A method, comprising:
flowing a working fluid along a working fluid path through a heat exchanger;
exchanging heat between the working fluid and an engine fluid from at least one of a compressor section, a lubricant path, or a coolant path of a combustion engine to generate a heated working fluid and a cooled engine fluid;
splitting the heated working fluid generated by the heat exchanger into first and second flow paths upstream from a deaerator of a steam system, wherein the first flow path directs a first portion of the heated working fluid to the deaerator and the steam system, the second flow path returns a second portion of the heating working fluid to the working fluid path that passes through the heat exchanger, and the steam system is configured to receive the heated working fluid from the heat exchanger as a make-up water supply of working fluid to replace working fluid lost within a process of the steam system;
regulating, via a controller, a first flow of the first portion of the heated working fluid along the first flow path from the heat exchanger to the steam system and a second flow of the second portion of the heated working fluid along the second flow path back to the working fluid path with one or more flow control devices simultaneously and based on sensor feedback, wherein the sensor feedback is received from one or more sensors coupled to the combustion engine, the heat exchanger, one or more fluid flow paths, or the steam system, wherein the one or more flow devices are coupled to the combustion engine, the heat exchanger, one or more fluid flow paths, or the steam system, and wherein the first flow replaces at least 80 percent of a turbine extraction steam to facilitate deaeration in the deaerator; and
producing, via the steam system, a steam supply utilizing at least a portion of the heated working fluid.

16. The method of claim 15, comprising:
flowing the first portion of the heated working fluid along the first flow path from the heat exchanger to the deaerator of the steam system;
removing one or more corrosive components and/or dissolved gases in the first portion of the heated working fluid to produce a deaerated heated working fluid; and
routing the deaerated heated working fluid to a boiler configured to produce steam at least in part based on the deaerated heated working fluid.

17. The method of claim 15, comprising regulating the temperature of the heated working fluid to be at least approximately 90 degrees Celsius.

* * * * *